(12) United States Patent
Creel et al.

(10) Patent No.: US 7,366,680 B1
(45) Date of Patent: Apr. 29, 2008

(54) PROJECT MANAGEMENT SYSTEM AND METHOD FOR ASSESSING RELATIONSHIPS BETWEEN CURRENT AND HISTORICAL PROJECTS

(75) Inventors: Christopher Taylor Creel, Tampa, FL (US); Oscar A. Chappel, New Port Richey, FL (US)

(73) Assignee: Perot Systems Corporation, Plano, TX (US)

( * ) Notice: Subject to any disclaimer, the term of this patent is extended or adjusted under 35 U.S.C. 154(b) by 1191 days.

(21) Appl. No.: 10/093,782

(22) Filed: Mar. 7, 2002

(51) Int. Cl.
*G06F 17/30* (2006.01)
(52) U.S. Cl. ...................................................... 705/10
(58) Field of Classification Search ..................... None
See application file for complete search history.

(56) References Cited

U.S. PATENT DOCUMENTS

| | | | |
|---|---|---|---|
| 5,189,606 A * | 2/1993 | Burns et al. .................... 705/10 |
| 5,826,252 A * | 10/1998 | Wolters et al. ................. 707/1 |
| 5,862,252 A * | 1/1999 | Yamamoto et al. ......... 382/154 |
| 5,918,219 A * | 6/1999 | Isherwood ..................... 705/37 |
| 6,578,004 B1 * | 6/2003 | Cimral et al. ................... 705/7 |
| 6,917,921 B1 * | 7/2005 | Cimral et al. ................... 705/7 |
| 7,035,809 B2 * | 4/2006 | Miller et al. ................... 705/8 |
| 7,158,940 B2 * | 1/2007 | Cimral et al. ................... 705/7 |
| 2003/0023470 A1 * | 1/2003 | Labbi ............................... 705/7 |
| 2003/0070157 A1 * | 4/2003 | Adams et al. ............... 717/101 |
| 2003/0135399 A1 * | 7/2003 | Ahamparam et al. .......... 705/7 |
| 2003/0208429 A1 * | 11/2003 | Bennett ........................ 705/36 |

OTHER PUBLICATIONS

Shepperd et al., Effort Estimation Using Analogy Proceedings of ICSE-18, IEEE, 1996, pp. 170-178.*
Shepperd et al., Effort Estimation by Analogy: A Case Study ESCOM 7, 1996.*
Shepperd et al., Estimating Software Project Effort Using Analogies IEEE Transactions on Software Engineering, vol. 23, No. 12, Nov. 1997, pp. 736-743.*
Mukhopadhyay et al., Examining the Feasibility of a Case-Based Reasoning Model for Software Effort Estimation MIS Quarterly, vol. 16, No. 2, Jun. 1992, pp. 155-171.*
Simmons et al., Manager Associate IEEE Transactions On Knowledge and Data Engineering, vol. 5, No. 3, Jun. 1993, pp. 426-438.*
Mair et al., An Investigation of Machine Learning Based Prediction Systems Empirical Software Engineering Research Group, Jul. 9, 1999.*
Hefner, Rick, Managing Projects through a Corporate Repository Proceedings of the 33rd Hawaii International Conference on System Sciences, IEEE, 2000.*
Hastings T.E. et al., A Vector-Based Approach to Software Size Measurement and Effort Estimation IEEE Transactions on Software Engineering, Vo. 27, No. 4, Apr. 2001, pp. 337-350.*

(Continued)

*Primary Examiner*—Tariq R. Hafiz
*Assistant Examiner*—Scott L. Jarrett
(74) *Attorney, Agent, or Firm*—Winstead PC

(57) ABSTRACT

A method and system for objectively determining potential success of a new project and similarity of the new project to historical projects. By defining a master set of processes, practices, and/or personnel available to be utilized by the new project, relationships may objectively be determined between the new and historical projects. Statistical information developed by the historical projects may be utilized to indicate potential success of the new project.

11 Claims, 9 Drawing Sheets

OTHER PUBLICATIONS

Angelis L. et al., A Simulation Tool for Efficient Analogy Based Cost Estimation Empirical Software Engineering, vol. 5, No. 1, Mar. 2000, Abstract.*

Miranda, Eduardo, Improving Subjective Estimates Using Paired Comparisons IEEE Software, Jan./Feb. 2001, pp. 87-91.*

Kirsopp, Collin et al., Search Heuristics, Case-Based Reasoning and Software Project Effort Prediction GEECO 2002.*

Shepperd, Automated Project Cost Estimations: Using Analogies, The ANGEL Project Jan. 2001, Retrieved from Archive.org Aug. 18, 2006.*

Wikipedia.org—Linear algebra, Euclidean distance and vector space definitions Retrieved from Wikipedia.org Aug. 18, 2006.*

Boehm et al., Software Cost Estimation with COCOMO II Prentice Hall PRT, 2000, ISBN: 0-13-026692-2.*

Simmons et al., Software Measurement—A visualization toolkit Hewlett-Packard Professional Books, Prentice-Hall PTR, 1998, ISBN: 0-13-840695-2.*

Roman, Daniel D., A Proposed Project Termination Audit Model IEEE Transactions onf Engineering Management, vol. EM30, No. 3, 1983, Abstract.*

Collier, Bonnie et al., A Defined Project Postmortem Project Review IEEE Software, 1996, pp. 65-72.*

Nolan, Andrew J., Learning from Success IEEE Software, Jan./Feb. 1999, pp. 97-105.*

Hormozi, Amir H. et al., The Project Life Cycle: The Termination Phase S.A.M. Advanced Management Journal, Winter 2000, vol. 65, No. 1, pp. 45-51.*

Davis, John et al., Determining A Project Probability Of Success Research Technology Management, May/Jun. 2001, vol. 44, No. 3, pp. 51-57.*

Martin, Paula K. et al., Close Out The Forgotten Phase Chemical Engineering Progress, Jan. 2002, vol. 98, No. 1, pp. 76-79.* von Zedtwitz, Maximiliam, Organizational learning throuh post-project reviews in R&D R&D Management vol. 32, No. 2, 2002, pp. 255-268.*

Simmons et al., Software Measurement A Visualization Toolkit Hewlett-Packard Professional Books,1997, ISBN: 0-13-840695-2.*

Hollman, John K., Project History—Closing the Look 1995 AACE Transactions.*

Nelson, Anthony C. et al., Application of a matrix approach to estimate project skill requirements Information & Management, vol. 29, 1995, pp. 165-172.*

Paulk, Mark C. et al., Capability Maturity Model for Software Version 1.1 Software Engineering Institure, 1996.*

Belout, Adnane, Effects of human resource management on project effectiveness and success International Journal of Project Management, vol. 16, No. 1, 1998, pp. 21-26.*

Hackos, Joann T., From Theory to Practice: Using the Information Process-Maturity Model as a Tool for Strategic Planning Technical Communication, Fourth Quarter 1997.*

Dvir, D. et al., In search of project classification: a non-universal approach to project success factors Research Policy, vol. 27, 1998, pp. 915-935.*

Poolton J. et al., The New Products Process: Effective Knowledge Capture and Utilisation Concurrent Engineering: Research and Applications, vol. 8, No. 2, Jun. 2000, pp. 133-143.*

Thomas, Michael, Building and Managing a winning project team Manage, vol. 52, No. 1, Aug./Sep. 2000, pp. 4-5.*

Mair, Carolyn et al., An investigation of machine learning based prediction systems The Journal of Systems and Software, vol. 53, 2000, pp. 23-29.*

Leo, Douglas, Using Project History to Assure Project Success 2002 AACE International Transaction.*

Payne, Stephen, How to Pick the Right People for the Project Data Communications, vol. 10, No. 11, Nov. 1981, Abstract.*

Leo, Dougla, Project History Retrieval and History AACE Internal Transactions, 1999.*

"The Big Picture", The Economist, pp. 1-3; Geneva; Jan. 4, 2001; Internet, www.economist.com/displayStory.dfm?Story_ID=463720.

The Big Picture; www.economist.com; Jan. 4, 2001; pp. 1-3.

* cited by examiner

| PRACTICES | PRACTICE A | PRACTICE B | PRACTICE C | PRACTICE D | PRACTICE E | ... | PRACTICE Y | PRACTICE Z | | DISTANCE FROM AVERAGE |
|---|---|---|---|---|---|---|---|---|---|---|
| PROJECT ID | 19 | 195 | 21 | 23 | 51 | ... | 84 | 34 | | |
| PROJECT A | 0 | 0 | 1 | 0 | 1 | ... | 0 | 1 | | 3 |
| PROJECT B | 0 | 1 | 0 | 0 | 1 | ... | 1 | 0 | | 1 |
| PROJECT C | 0 | 0 | 1 | 1 | 1 | ... | 1 | 1 | | 7 |
| AVERAGE PROJECT PRACTICES | 0 | 0 | 1 | 0 | 1 | ... | 1 | 1 | | — |

*FIG. 4*

500a
PROJECT A COMPOSITION

| ID | PROCESSES |
|----|-----------|
| 21 | PROCESS C |
| 51 | PROCESS E |
| 34 | PROCESS Z |

*FIG. 5A*

500b
PROJECT B COMPOSITION

| ID | PROCESSES |
|-----|-----------|
| 195 | PROCESS B |
| 51  | PROCESS E |
| 84  | PROCESS Y |

*FIG. 5B*

500c
PROJECT C COMPOSITION

| ID | PROCESSES |
|----|-----------|
| 21 | PROCESS C |
| 23 | PROCESS D |
| 51 | PROCESS E |
| 84 | PROCESS Y |
| 34 | PROCESS Z |

PROJECT A PERSONNEL

| ID | PERSONNEL |
|----|-----------|
| 2  | BRIAN     |
| 3  | CHRIS     |
| 5  | ELLEN     |
| 26 | ZEKE      |

PROJECT B PERSONNEL

| ID | PERSONNEL |
|----|-----------|
| 1  | AMY       |
| 2  | BRIAN     |
| 4  | DAVE      |
| 25 | YOLANDA   |

PROJECT C PERSONNEL

| ID | PERSONNEL |
|----|-----------|
| 1  | AMY       |
| 3  | CHRIS     |
| 5  | ELLEN     |
| 26 | ZEKE      |

*FIG. 7C*

Project Summary 900

Major Milestone Snapshots

| Structure | Average | Standard Deviation |
|---|---|---|
| Occurs on (day) | 28.66666667 | 3.785938897 |
| Percentage into Project | 46.53% | 4.66% |
| Branch Age (days) | 42.03957178 | 15.69075981 |
| Branch Mods (units of work) | 5.006072681 | 0.867769659 |
| Leaf Age (days) | 49.65468349 | 15.01726482 |
| Leaf Mods (units of work) | 3.92475067 | 0.308024586 |
| Total Branches | 120.6666667 | 31.21431296 |
| Total Leaves | 331.3333333 | 72.72780303 |
| Average Distance | 62.7996856 | 28.89407369 |
| Most Similar to Average | PROJECT B | 36.90022098 |
| Most Dissimilar From Average | PROJECT C | 93.96426881 |

— 905 / 925a

| Content | Average | Standard Deviation |
|---|---|---|
| Occurs on (day) | 39 | 7 |
| Percentage into Project | 63.64% | 12.48% |
| Branch Age (days) | 39.35629066 | 7.239413354 |
| Branch Mods (units of work) | 5.987320668 | 2.298726808 |
| Leaf Age (days) | 34.83090469 | 16.04297927 |
| Leaf Mods (units of work) | 6.390233259 | 0.691889635 |
| Total Branches | 179.6666667 | 71.00234738 |
| Total Leaves | 549.3333333 | 90.45625094 |
| Average Distance | 94.17295698 | 16.89415989 |
| Most Similar to Average | PROJECT B | 75.44907092 |
| Most Dissimilar From Average | PROJECT C | 108.2756496 |

— 910 / 925b

| Stabilization | Average | Standard Deviation |
|---|---|---|
| Occurs on (day) | 56.66666667 | 7.505553499 |
| Percentage into Project | 91.66% | 3.80% |
| Branch Age (days) | 55.7990343 | 12.91168455 |
| Branch Mods (units of work) | 7.482788045 | 3.100728693 |
| Leaf Age (days) | 43.74352332 | 19.30475721 |
| Leaf Mods (units of work) | 8.776592651 | 2.744167848 |
| Total Branches | 200.6666667 | 99.32438438 |
| Total Leaves | 806.6666667 | 427.6708236 |
| Average Distance | 335.9435357 | 155.2206265 |
| Most Similar to Average | PROJECT B | 187.4938552 |
| Most Dissimilar From Average | PROJECT C | 497.1480411 |

— 915 / 925c

| Last Day Sanpshot | Average | Standard Deviation |
|---|---|---|
| Project Duration (days) | 61.66666667 | 5.773502692 |
| Branch Age (days) | 58.87929098 | 14.15054787 |
| Branch Mods (units of work) | 8.017483791 | 3.067630848 |
| Leaf Age (days) | 50.64884664 | 18.94634114 |
| Leaf Mods (units of work) | 8.959876577 | 2.770440346 |
| Total Branches | 500.6666667 | 102.7959143 |
| Total Leaves | 810.3333333 | 446.2032422 |
| Average Distance | 351.7493901 | 157.1066646 |
| Most Similar to Average | PROJECT B | 208.7470815 |
| Most Dissimilar From Average | PROJECT C | 519.9214235 |

PROJECT MANAGEMENT SYSTEM AND METHOD FOR ASSESSING RELATIONSHIPS BETWEEN CURRENT AND HISTORICAL PROJECTS

CROSS-REFERENCES TO RELATED APPLICATIONS

This application for patent is related to, and hereby incorporates by reference for any purpose the entire disclosure of, co-pending U.S. application for patent Ser. No. 09/760,339 filed Jan. 12, 2001; Ser. No. 09/859,320 filed May 16, 2001; Ser. No. 10/000,972 filed Oct. 24, 2001; Ser. No. 09/916,088 filed Jul. 26, 2001; and Ser. No. 09/998,474 filed Nov. 29, 2001.

BACKGROUND OF THE INVENTION

1. Technical Field of the Invention

The principles of the present invention are generally related to development projects, and more specifically, but not by way of limitation, to a method and system for objectively assessing relationships between the development projects.

2. Description of Related Art

Projects that commercial and governmental organizations develop typically have processes and/or practices (collectively practices) applied thereto in order to conduct a smooth and successful project. Over the course of time, the organizations have successes and failures in conducting the projects while applying the practices. Each project often demands a different set of practices due to constraints and variables associated with the particular project. The practices may be related to requirements, specifications, management, testing, manufacturing, or any other type of discipline to be applied for conducting a successful project.

As is often the case, the organizations utilize particular practices in conducting new or current projects based on subjective knowledge and qualitative understanding of individuals who were involved with projects that were historically successful or unsuccessful. Alternatively and/or additionally, an organization may decide to choose one process over another based on familiarity or comfort with a process rather than effectiveness of a process to satisfy a particular need of the current project. As the practices for each project may vary, the success or effectiveness of the project may be due to the combination of the practices. However, organizations generally use "lessons learned" of historical projects, which, typically, are not quantitatively assessed, in determining which practices to apply to the new projects. This type of subjective determination of practices to be applied to new projects tends to result in sub-optimal project developments. Further, organizations typically do not itemize the practices in use on a particular project, thereby making subjective or quantitative assessments of questionable value because of the difficulty in describing what practices, in particular, are being assessed.

Consultants of projects who assist in determining which practices to be applied to new projects are often asked the questions: "How similar does the set of practices relate to those of other historical projects?" and "Based on the set of practices, how successful will the new project be?" Each of these questions is often difficult, if not impossible, to answer by the consultant-especially if an objective, quantitative answer is expected.

SUMMARY OF THE INVENTION

To overcome the problem of having to provide a subjective determination of (i) the potential success of a new project and (ii) similarity to other historical projects, a method and system for objectively determining potential success of the new project and similarity of the new project to historical projects have been developed. By defining a master set of processes, practices, and/or personnel available to be utilized by the new project, relationships may objectively be determined between the new and historical projects. Statistical information developed by the historical projects may be utilized to indicate potential success of the new project.

One method to objectively assess the new or current project according to the principles of the present invention includes receiving a request to develop a current project. Practices to be utilized in developing the current project may be determined. Potential success of the current project may be objectively assessed on the practices to be utilized in developing the current project and practices used by the historical projects. One or more vectors indicative of the practices and personnel to be utilized in developing the current project may be formed.

Another embodiment to objectively analyze projects includes forming a master set of elements applicable to the projects. Elements of the master set of elements applied to individual projects may be identified. A statistical analysis of the projects based on the identified elements may be performed, where the statistical analysis provides an objective assessment of a relationship of the projects. The relationship may include a vector distance between the projects. The statistical analysis may include performing a vector average of identified elements of the projects. Clusters formed by the identified elements applied to the individual projects may be determined so as to identify relationships therebetween. An analysis of the identified elements amongst a set of projects may be performed to determine utility of each element, where elements without utility may be eliminated and elements with utility may be further supported (e.g., training provided to personnel).

To provide for the objective analysis (i) between the new and historical projects and (ii) amongst historical projects, a database may be utilized. In one embodiment, the database includes data elements representative of available processes being applicable to a project. A set of data values is individually associated with respective data elements for a given project, where the data values are indicative of data elements being applicable to the given project. Each project includes a set of data values, which may be formed into a vector to identify the data elements associated therewith. The data elements may include available practices and personnel for inclusion on the given project.

BRIEF DESCRIPTION OF THE DRAWINGS

A more complete understanding of the method and apparatus of the principles of the present invention may be obtained by reference to the following Detailed Description when taken in conjunction with the accompanying Drawings wherein:

FIG. 4 is an exemplary cumulative chart indicative of processes applied to individual projects of FIG. 3;

FIGS. 5A-5C are tables indicative of processes applied to the individual projects of FIG. 4;

FIGS. 7A-7C are tables identifying personnel utilized in conducting the projects of FIG. 6;

FIG. 9 is an exemplary table providing a summary of statistical information generated by the projects of FIG. 3 and relationship information between the projects utilizing the principles of the present invention.

DETAILED DESCRIPTION OF THE PRESENTLY PREFERRED EXEMPLARY EMBODIMENTS

Figure 1:
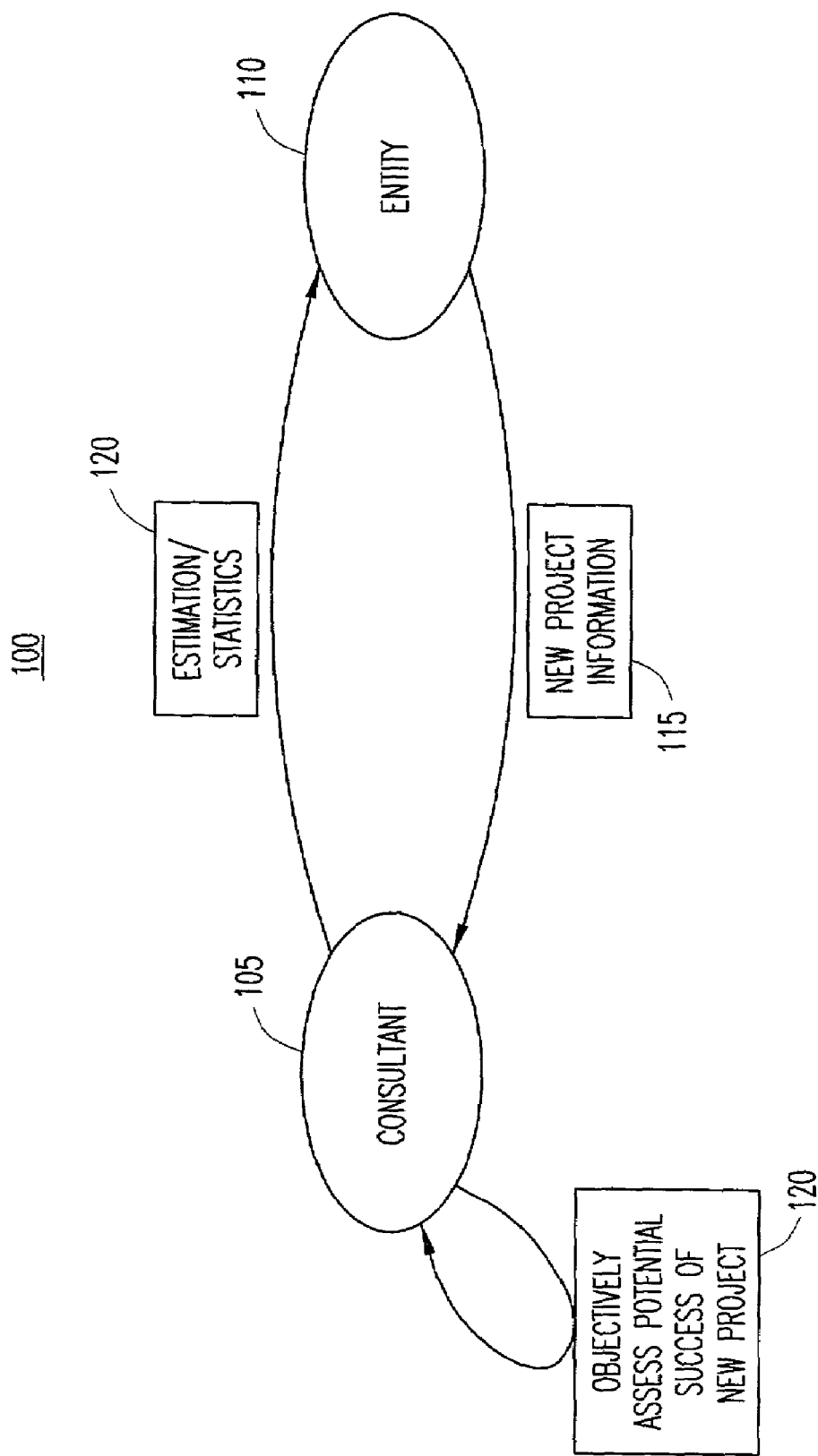
FIG. 1 is an exemplary block diagram providing an interrelationship between a consultant and an entity developing a new project.

The principles of the present invention provide for a consultant, external or internal to an entity developing a project, to objectively analyze projects based on processes, practices, and/or personnel utilized to procure the projects. The processes and/or practices (collectively practices) may be applicable to a variety of disciplines, including requirements, specifications, management, testing, and manufacturing, for example, and may be established as a master set of elements utilized by projects performed in the past (i.e., historical projects) and new or future projects. A practice may be as simple as utilizing a particular software application to perform word processing or may be as complex as utilizing certain "brainstorming" techniques in performing research and development activities. A more complete discussion of practices may be found in co-pending U.S. patent application Ser. No. 10/000,972, incorporated herein by reference.

By itemizing or forming a "complete" list of practices, the consultant may identify the particular practices applied to each project to identify a "project DNA," where each practice may be considered a "chromosome" of the DNA. The project DNA may or may not be unique to any particular project, but merely is representative of the practices that the particular project utilized or utilizes. In one embodiment, the project DNA is formed by utilizing a spreadsheet to develop a vector having binary or other values (e.g., weighted values) that indicate the particular practices are utilized to some extent for the project. Alternatively, other mathematical tools, such as curves, may be utilized to represent practices utilized in performing a project. Upon more than one project being represented by a project DNA or vector, mathematical vector operations may be performed to determine relationships between the projects and practices applied thereto.

The mathematical vector operations may include forming an average vector of the vectors identifying the projects. In one embodiment, a vector distance from the average may be determined as understood in the art for each project vector to determine relationships amongst the different projects. Additionally and/or alternatively, vector distances may be performed between individual project vectors to determine similarity between the different projects. Still yet, other mathematical operations, such as clustering, may be utilized to determine relationships amongst the different projects. A consultant may utilize the results of performing the mathematical vector operations to objectively assess new projects to provide a client with potential estimates and results of the new project based on related historical projects. Accordingly, upon the new projects being objectively determined to be related to historical projects, statistics and/or metrics of the related historical projects may be provided to the client. The ability to provide such feedback and analysis allows the client to make informed business decisions regarding how to proceed with a new project based on specific related data.

Because the historical projects have been categorized, an analysis may be performed to identify weak and valuable practices. The weak practices may be removed from future use and the strong ones may initiate mandatory training procedures to further strengthen knowledge of the practices by the personnel of the client. In addition to practices being established for particular projects, personnel utilized for each project may also be identified in a similar manner. By identifying the personnel, weak and strong personnel may be identified based on statistical results of the project. Accordingly, teams formed of personnel may be identified that produce successful projects based on the statistical results of the projects. Vector analysis similar to that used for analyzing practices for the projects may be utilized for the personnel. Accordingly, the information, including practices, personnel, and statistical results, generated during the projects may be utilized by the consultant and entity to perform objective analysis for current, future and historical projects. The information may be stored in one or more databases as understood in the art.

FIG. 1 is an exemplary block diagram 100 providing an interrelationship between a consultant 105 and an entity 110 developing a new project. As is often done when developing projects, the consultant 105 works with an entity 110, which may be a commercial or governmental entity, during the embryonic phase of the projects. The consultant 105 is typically requested to assist with developing a new project, and in that regard, the entity 110 provides new project information 115 to the consultant 105. The consultant 105 is often asked by the entity 110 to provide the entity 110 with a strategy for developing the new project. According to the principles of the present invention, the consultant 105 objectively assesses potential success of the new project at step 120. In objectively assessing the potential success of the new project, the consultant 105 may utilize historical projects that have been previously defined by practices applied thereto. Additionally, the consultant may have statistical information as to the results of the historical projects to indicate the success thereof. Once the consultant 105 has objectively assessed potential success of the new project, the consultant 105 may provide the entity 110 with information 120 including an estimation and/or statistics of the new project in view of the historical projects. The information 120 may be determined by forming a relationship between the new project and the historical projects based on the new project information 115 provided by the entity 110. The information 120 provided to the entity 110 allows the entity 110 to make an informed business decision as to the potential success and strategy to be utilized for procuring the new project.

Figure 2:
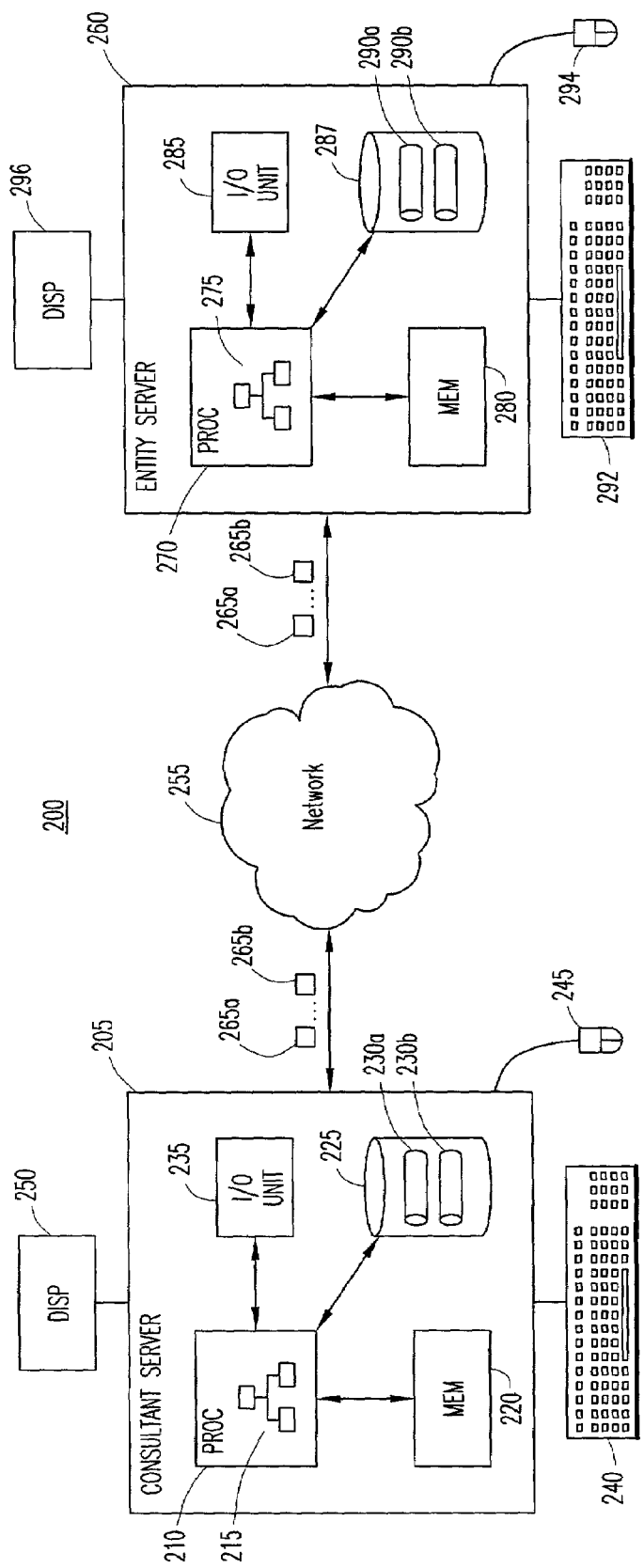
FIG. 2 is an exemplary block diagram of a computing system operable to provide one embodiment for the interrelationship provided in FIG. 1.

FIG. 2 is an exemplary block diagram 200 of a system operable to provide one embodiment for the interrelationship provided in FIG. 1. A consultant server 205 includes a processor 210 that executes software 215 for assisting and performing the objective analysis of the new project of the entity 110. The processor is coupled to a memory 220 and storage unit 225. The storage unit 225 may include one or more databases 230a and 230b (collectively 230) that include information related to the new project and historical projects. The historical projects may have identifying information and historical information associated therewith that are utilized by the software 215. The processor 210 is further coupled to an input/output (I/O) unit 235 that is operable to communicate outside the consultant server 205. Input and/or control devices 240 and 245, which may include a keyboard and computer mouse, respectively, may be utilized to enter the new project information 115 into the consultant server 205. A display 250 may be utilized to display information associated with the new project and historical projects in developing the objective analysis of the new project for the entity 110.

Although the consultant 105 may receive the new project information 115 via verbal or written communication, the consultant 105 may alternatively receive the new project information 115 from the entity 110 via an electronic communication. In that regard, the consultant server 205 may be coupled to a network 255, such as the Internet, to receive the new project information 115 from an entity server 260 in the form of data packets 265a and 265b (collectively 265) as understood in the art.

The entity server 260 may include similar components as a consultant server 205, including a processor 270 for operating software 275. The processor 270 may be coupled to a memory 280 and I/O unit 285. The processor 270 may further be coupled to a storage device 287 having databases 290a and 290b (collectively 290) having data associated with projects stored therein. Input and/or control devices 292 and 294 may be utilized to assist in operating the software 275 for input and control of the new project information 115 and historical project information. A display 296 may be utilized to display information generated by the software 275 and/or received from the consultant server 205. It should be understood that the software 215 and 275 may be the same or different and that the consultant may generate information associated with historical projects or the entity may perform the objective analysis for the new projects separately.

Figure 3:
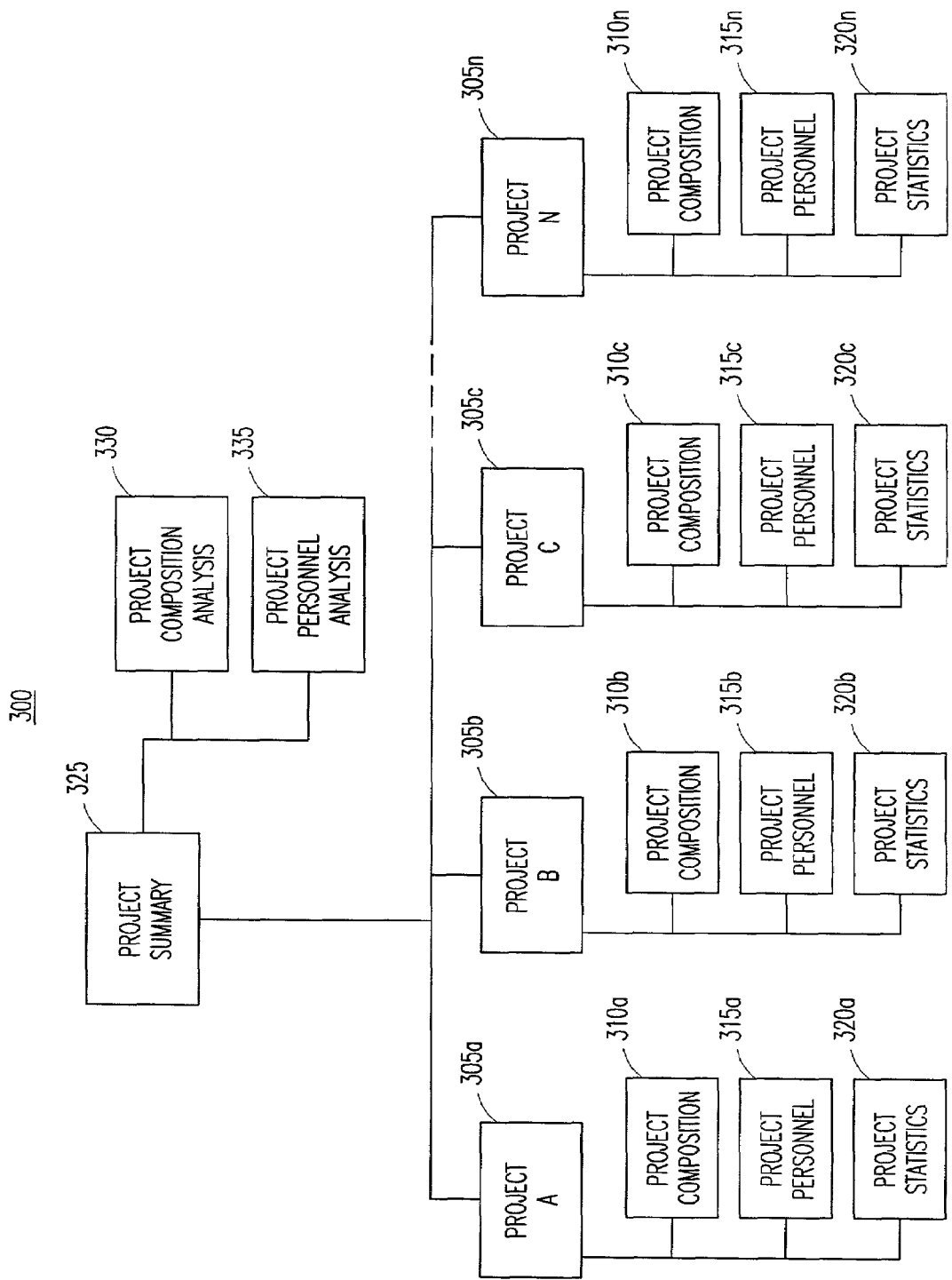
FIG. 3 is an exemplary block diagram formed as a tree structure including data associated with individual projects that may be used in FIGS. 1 and 2.

FIG. 3 is an exemplary block diagram formed as a tree structure 300 including data associated with individual projects that may be used in FIGS. 1 and 2. As shown, the tree structure 300 includes multiple projects 305a-305n (i.e., projects A-N). Each project 305a-305n (collectively 305) may include information associated therewith. The information may include project composition 310a-310n (collectively 310), project personnel 315a-315n (collectively 315) and project statistics 320a-320n (collectively 320). The projects 305 may be historical projects (i.e., those that have been completed in the past) and/or current or new projects being developed. In the case of the projects 305 being a new project, the project composition 310 and project personnel 315 may be defined, but the project statistics 320 may not be defined as no statistics have yet been developed.

A project summary 325 may be developed by summarizing the information associated with each project 305. The project summary may include a project composition analysis 330 and project personnel analysis 335. To develop the project summary 325, the software 215 may be utilized in conjunction with the databases 230 that include the information of the projects 305.

FIG. 4 is an exemplary cumulative chart 400 indicative of practices applied to individual projects of FIG. 3. The cumulative chart 400 may include a master set of elements 405, including practices A-Z. The master set of elements 205 may be a list of identifiers that are operable to describe the practices applied to the projects 305. Because the master set of practices 405 is inclusive for the projects, it should be understood that each project may utilize one or more of the practices as some of the practices may be mutually exclusive.

Each practice of the master set of practices 405 may be defined by an identifier (ID) 410, which may be a number or alphanumeric value. The IDs 410 are unique identifiers and are basically utilized for searching purposes of the software 215 to generate the cumulative chart 400. As shown, each project 305a-305c is listed in a separate row with columns of identifiers indicative of a practice being utilized for the particular project (e.g., 305) Each row of identifiers associated with the particular projects 305 forms a vector, which may be thought of as DNA of the project, that defines the practices applied to the project. For example, in the case of project A, practices C, E, and Z were utilized, and, thus, each identified as having a value of one. It should be understood that the identifiers may have non-binary values, such as weighted values between zero and one or between zero and one-hundred, for example.

Referring now to FIGS. 5A-5C, tables are provided to indicate the particular practices utilized for each project are shown. In forming the cumulative chart 400, the charts 500a-500c are utilized by the software 215 to form the vectors indicative of the practices utilized for each of the projects 305.

Referring again to FIG. 4, the software 215 may generate average project practices 415, which may be a vector indicative of the average of the columns of practices from the master set of practices 405. As shown, practices A, B, and D have an average of zero, while practices C, E, Y, and Z have an average of one (rounded up). Weighted values, of course, could have non-binary values as a result of the averaging process. The average project practices is indicative of the average practices utilized by the projects 305. Once the average project practices 415 have been defined, vector algebra may be applied so as to determine other statistical information therefrom. For example, a distance from the average project practices 415 may be determined for each of the projects 305. As shown, project A has a distance of 3, project B has a distance of 1, and project C has a distance 7 from the average project practices 415. Accordingly, the consultant 105 may objectively determine that project B utilizes a set of practices that is the closest to the average project practices 415 of the three projects A-C. By knowing that project B is the closest to the average project, the consultant 105 may utilize statistical information of project B to determine the results of success that the average project may have. Additionally, average statistics may be generated from each of the projects so as to provide the consultant with a representative average project.

In addition to determining the average project practices 415 of the projects 305, the consultant 105 may apply the new project information 115 to determine how close the new project correlates to the average project 415 or particular historical projects 305. In other words, the consultant 105 may determine the practices to be applied to the new project and, based on those practices, determine which projects 305 that the new project is most closely related. Accordingly, the projects 305 most closely related to the new project may be identified or determined by performing matrix algebra to determine a distance from individual projects or the distance from the average project. As understood in the art, the vector distance is determined by performing a square root of the sum of the squares of the difference of each corresponding identifier or vector element. It should be understood that other mathematical relationships may be formed to describe relationships between or amongst projects.

While the consultant 105 may determine historical projects that most closely relate to the new project and provide statistics 120 to the entity 110, the entity 110 may request from the consultant 105 (or determine on its own) a clustering of the projects 305 based on the practices associated therewith. The clustering may be determined by applying standard mathematical techniques (e.g., Kohonen computation, which is an unsupervised neural network) to allow the entity 110 to identify trends or other models of projects being utilized. As a result, unutilized practices may be eliminated and heavily utilized practices may be determined as practices for which further development is desirable (for example, practices for which organizations may wish to provide standard training to personnel).

Figure 6:
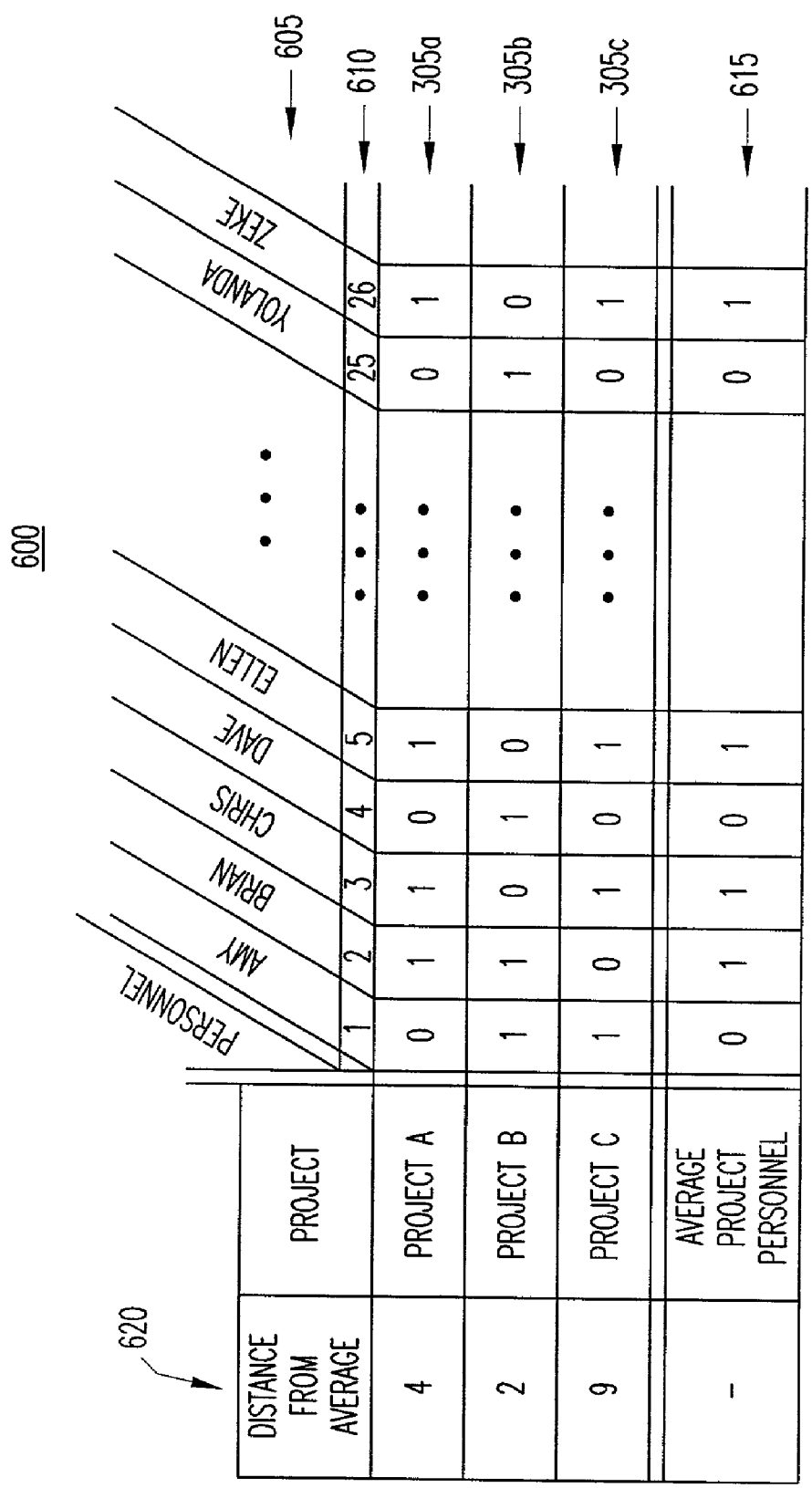
FIG. 6 is an exemplary cumulative chart identifying personnel utilized in conducting the individual projects of FIG. 4.

FIG. 6 is an exemplary cumulative chart 600 identifying personnel applied to the individual projects of FIG. 4. The cumulative chart 600 is similar to that of cumulative chart 400, however, rather than practices being identified, a master set of personnel 605 is defined such that each project 305 may have identifiers associated therewith indicative of personnel utilized to procure the projects 305. Additionally, identifiers 610 may be utilized to represent the master set of personnel 605 to ease operation of the software 215. Vectors of identifiers may be applied to the cumulative chart 600 based on identifying personnel associated with each project 305. Average project personnel 615 may be determined as a vector based on the vector identifying the personnel for the different projects 305. As shown, Brian, Chris, Ellen, and Zeke are represented as being personnel utilized for the average project. A distance from average may be computed utilizing matrix or vector algebra as previously discussed. Accordingly, upon a new project being developed, personnel determined to be utilized for the new project may be identified and associated with historical projects. The new project may be determined objectively to be the most closely related to an historical project and/or an average project so as to provide the entity 110 with an objective indication as to how the personnel may perform on the new project. Statistical information, may be provided to the entity 110 by the consultant 105 based on the project objectively deemed to be closest thereto.

FIGS. 7A-7C are tables 700a-700c including personnel applied to the projects of FIG. 4. Each of these tables 700a-700c identify the personnel utilized for each of the projects 305. Accordingly, the software 215 may utilize the information in the tables to generate the identifiers shown in the cumulative chart 600.

Figure 8:
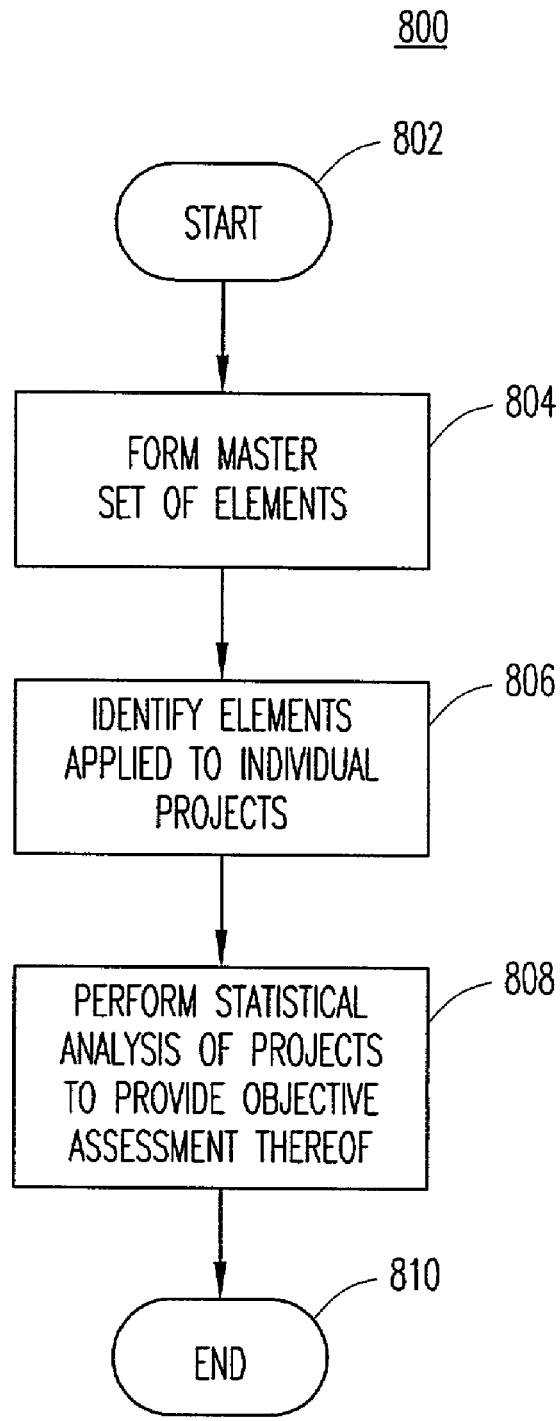
FIG. 8 is an exemplary flow diagram describing the process for objectively assessing the projects of FIG. 4.

FIG. 8 is an exemplary flowchart 800 describing the process for objectively assessing the projects of FIG. 4. The process starts at step 802. At step 804 a master set of elements is formed. At step 806, elements applied to individual projects are identified. The elements may be practices and/or personnel utilized to perform the projects. At step 808, statistical analysis of the projects is performed to provide an objective assessment thereof. The statistical analysis may include performing mathematical computations, such as distance calculations using vector or matrix algebra The process ends at step 810.

The flowchart 800 may be utilized for determining a relationship between a new project and historical projects. Alternatively, historical projects may be objectively analyzed in determining practices and/or personnel that are most/least prevalent. Such an objective analysis may allow the entity 110 to eliminate or provide additional training for the practices and/or personnel. In the case of analyzing a new project, once it is objectively determined which historical project is most closely related to the new project based on practices and/or personnel being applied thereto, the entity 110 may make a business decision based on historical information, such as statistical results and metrics from the historical projects, to utilize the practices selected to be utilized for the new project or make alternative selections prior to starting the new project.

FIG. 9 is an exemplary table 900 providing a summary of statistical information generated by the projects of FIG. 3 and relationship information between the projects utilizing the principles of the present invention. The table 900 provides project summaries of statistical information developed during historical projects. The statistical information may be generated in accordance with co-pending U.S. patent application Ser. Nos. 09/760,339, 09/859,320, 09/916,088 and 09/998,474, which are incorporated herein by reference. As shown, there are several sections of results from historical projects, including structure 905, content 910, stabilization 915, and last day 920. The statistical information for each of these sections 905-920 may be developed from the statistical information from each of the projects 305. As shown, an average and a standard deviation is provided for each item. Based on the principles of the present invention, the projects most similar and dissimilar from the average projects have been identified by items 925a-925d. The statistical information provided herein is indicative of success of the historical projects 305 that have been identified utilizing the principles of the present invention. In other words, the historical projects 305 that have been identified by data elements (e.g., practices and/or personnel) may be utilized to provide the consultant 105 and/or entity 110 with information related to historical projects in developing a new project.

The previous description is of a preferred embodiment for implementing the invention, and the scope of the invention should not necessarily be limited by this description. The scope of the present invention is instead defined by the following claims.

What is claimed is:

1. A method of determining a set of development project practices and persons to utilize for a new development project, the method comprising:

forming a master set of hierarchical elements to be utilized when developing new projects;

wherein the master set of hierarchical elements comprises a plurality of practices and persons;

wherein the master set of elements are related to at least one of requirements, management, testing, manufacturing, and specifications;

identifying, from the master set of hierarchical elements, a plurality of elements utilized by at least one historical or current project;

forming a vector comprising a plurality of binary and non-binary weighted values and indicative of the plurality of elements utilized by the at least one historical or current project;

receiving a request to develop a new project and information related to the new project;

forming, using the received information, a vector comprising a plurality of binary and non-binary weighted-values and indicative of a subset of the master set of elements to be utilized by the new project;

quantitatively assessing correlation of the new project and the at least one historical or current project via a statistical analysis of the at least one historical or current project and the new project, the statistical analysis comprising:

determining a vector distance between the vector indicative of the plurality of elements applied to the at least one historical or current project and the vector indicative of the subset of the master set of elements to be applied to the new project; and generating an average vector of the vector indicative of the plurality of elements applied to the at least one historical or current project and at least one vector indicative of a plurality of elements applied to another historical project; and identifying, based on the statistical analysis, at least one historical or current project closely correlated to the new project;

providing a user with an estimate associated with the new project based on the identifying step;

identifying weak and valuable practices and personnel utilized by the at least one historical or current project based on the statistical analysis;

selecting a subset of the master set of elements to be utilized in developing the new project based, at least in part, on the identified at least one closely correlated project, the provided estimate associated with the new project, and the quantitatively assessed correlation;

wherein the selected subset comprises at least one identified valuable practice or person and excludes at least one identified weak practice or person; and developing the new project using the selected subset of the master set of elements.

2. The method of claim 1, wherein the plurality of practices comprise at least one of requirements, management, testing, manufacturing, and specifications.

3. The method of claim 1, wherein the statistical analysis is indicative of the success of a historical project of the at least one historical or current project.

4. The method of claim 1, wherein the statistical analysis comprises clustering.

5. The method of claim 1, wherein:

each of the at least one historical or current project and the new project is listed in a separate row;

columns of identifiers indicate project element use; and each row of identifiers associated with a particular project represents a particular project vector.

6. The method of claim 1, wherein the non-binary weighted values range from zero to one hundred.

7. The method of claim 1, wherein the step of quantitatively assessing comprises generating average statistics to provide a representative average project.

8. The method of claim 1, wherein the vector indicative of the subset of the master set of elements to be applied to the new project is defined by itemizing a master set of practices and associating a value corresponding to each practice of the master set of practices to be utilized in developing the new project.

9. The method of claim 1, further comprising determining whether the at least one historical or current project is closely related to the new project based on the statistical analysis.

10. The method of claim 1, further comprising initiating training procedures on the valuable practices.

11. The method of claim 1, wherein the developing step comprises determining how closely the vector indicative of the elements to be applied to the new project correlates to the average vector.

* * * * *